United States Patent
Todd et al.

(10) Patent No.: US 9,098,803 B1
(45) Date of Patent: Aug. 4, 2015

(54) HYPOTHESES AGGREGATION IN DATA ANALYTICS

(71) Applicant: EMC Corporation, Hopkinton, MA (US)

(72) Inventors: Stephen Todd, Shrewsbury, MA (US); Rhonda Baldwin, Campbell, CA (US); David Dietrich, Hopedale, MA (US); Wayne A. Pauley, Hudson, NH (US)

(73) Assignee: EMC Corporation, Hopkinton, MA (US)

( * ) Notice: Subject to any disclaimer, the term of this patent is extended or adjusted under 35 U.S.C. 154(b) by 430 days.

(21) Appl. No.: 13/724,752

(22) Filed: Dec. 21, 2012

(51) Int. Cl.
*G06N 5/02* (2006.01)

(52) U.S. Cl.
CPC .......................... *G06N 5/02* (2013.01)

(58) Field of Classification Search
None
See application file for complete search history.

(56) References Cited

U.S. PATENT DOCUMENTS

| | | | |
|---|---|---|---|
| 2004/0128287 A1* | 7/2004 | Keller et al. | 707/3 |
| 2008/0294583 A1* | 11/2008 | Hunt et al. | 706/46 |
| 2010/0017870 A1* | 1/2010 | Kargupta | 726/14 |
| 2013/0091170 A1* | 4/2013 | Zhang et al. | 707/783 |
| 2013/0173569 A1* | 7/2013 | Pearcy | 707/706 |
| 2013/0326538 A1* | 12/2013 | Gupta et al. | 718/107 |
| 2014/0115610 A1* | 4/2014 | Marinelli et al. | 719/330 |

OTHER PUBLICATIONS

Gunda et al, Nectar: Automatic Management of Data and Computation in Datacenters, 2010.*
Herodotou et al, Starfish: A Selftuning System for Big Data Analytics, 2011.*
Nykiel et al, MRShare: Sharing Across Multiple Queries in MapReduce, 2010.*
Zhang et al, Sedic: Privacy-Aware Data Intensive Computing on Hybrid Clouds, 2011.*
P. Mell et al., "The NIST Definition of Cloud Computing," U.S. Department of Commerce, Computer Security Division, National Institute of Standards and Technology, Special Publication 800-145, Sep. 2011, 7 pages.
U.S. Appl. No. 13/628,589 filed in the name of Wayne A. Pauley, Jr. et al. on Sep. 27, 2012 and entitled "Data Analytics Lifecycle Automation."

* cited by examiner

*Primary Examiner* — Jeffrey A Gaffin
*Assistant Examiner* — Mikayla Chubb
(74) *Attorney, Agent, or Firm* — Ryan, Mason & Lewis, LLP

(57) ABSTRACT

Techniques for aggregating hypotheses for use in data analytics. In one example, a method comprises the following steps. A plurality of hypotheses associated with one or more data analytics tasks are stored in a storage queue. Two or more hypotheses of the plurality of hypotheses are selected for aggregation. The selected two or more hypotheses are aggregated into a hypotheses group such that the selected two or more hypotheses of the hypothesis group are processed together using one or more common resources to perform at least one of the one or more data analytics tasks.

19 Claims, 5 Drawing Sheets

HYPOTHESES AGGREGATION IN DATA ANALYTICS

FIELD

The field relates to data analytics, and more particularly to techniques for aggregating hypotheses for use in data analytics.

BACKGROUND

Data analytics typically refers to the science that incorporates various disciplines including, but not limited to, data engineering, mathematics, statistics, computing, and domain-specific expertise. A data scientist thus is one who practices some or all aspects of data analytics in attempting to solve complex data problems.

Conventional data analytics solutions are becoming more and more limited due to the increasing sizes of data sets that such solutions are applied against. Such limitations include the lack of ability to adequately calculate the cost of the data analytics solution, including costs associated with computing resources and time consumption. Also, significant inefficiencies can occur when the data analytics solution has to repeat processes on the same set of data.

Accordingly, improved data analytics techniques are needed that enable business users and data scientists to execute data analytics more easily and efficiently.

SUMMARY

Embodiments of the invention provide techniques for aggregating hypotheses for use in data analytics.

In one embodiment, a method comprises the following steps. A plurality of hypotheses associated with one or more data analytics tasks are stored in a storage queue. Two or more hypotheses of the plurality of hypotheses are selected for aggregation. The selected two or more hypotheses are aggregated into a hypotheses group such that the selected two or more hypotheses of the hypothesis group are processed together using one or more common resources to perform at least one of the one or more data analytics tasks.

In another embodiment, a computer program product is provided which comprises a processor-readable storage medium having encoded therein executable code of one or more software programs. The one or more software programs when executed by one or more processing elements of a computing system implement the steps of the above-described method.

In yet another embodiment, an apparatus comprises a memory and a processor operatively coupled to the memory and configured to perform the steps of the above-described method.

Advantageously, embodiments described herein provide techniques for use with data analytics solutions that substantially improve ease of use and efficiency by leveraging the aggregation of multiple hypotheses.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and deploying one or more computing resources in a computing system, such as for example, in a cloud infrastructure environment, generating and deploying one or more virtual machines in a data center.

It is to be appreciated that prior to a detailed description of hypotheses aggregation techniques according to embodiments of the invention, we will first describe, in Section I, an exemplary data analytics lifecycle automation and provisioning system in which the hypotheses aggregation techniques can be implemented. Illustrative hypotheses aggregation techniques will then be described below in Section II. However, it is to be further appreciated that the hypotheses aggregation techniques may be alternatively implemented in a standalone system or in any other data analytics system in which it would be desirable to improve ease of use and efficiency of the system.

I. Exemplary Data Analytics Lifecycle Automation and Provisioning System

FIGS. 1A through 4 will be used to describe the exemplary data analytics lifecycle automation and provisioning system. Further details of this exemplary system can be found in the U.S. patent application identified as Ser. No. 13/628,589, filed on Sep. 27, 2012, and entitled "Data Analytics Lifecycle Automation," the disclosure of which is incorporated by reference herein in its entirety.

Figure 1A:
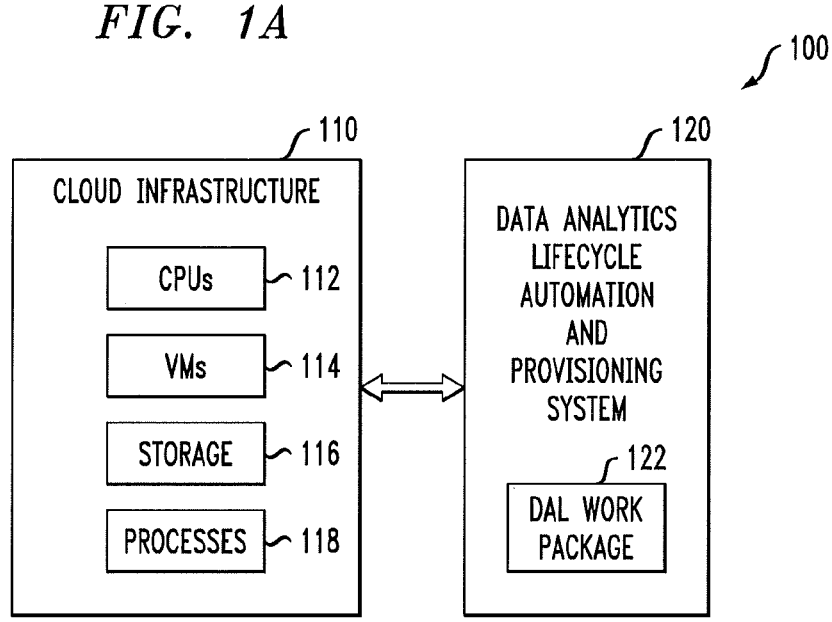
FIG. 1A illustrates cloud infrastructure and a data analytics lifecycle automation and provisioning system, in accordance with one embodiment of the invention.

FIG. 1A shows a system 100 configured in accordance with an illustrative embodiment of the present invention. The system 100 comprises cloud infrastructure 110 and a data analytics lifecycle automation and provisioning system 120.

As will be explained in detail below, the data analytics lifecycle automation and provisioning system 120 enables a data scientist to automatically, yet still interactively, create a work package 122 that can be executed to solve one or more complex data problems. By "work package" it is meant a specific executable plan (e.g., a data analytic plan) for solving the one or more complex data problems. System 120 accomplishes this, as will be explained in detail below, by providing processing elements that embody phases of a data analytics lifecycle (DAL) including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by system 120 can be operationalized using execution components (both physical and virtual computing resources) in the cloud infrastructure 110.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data analytics lifecycle automation and provisioning 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
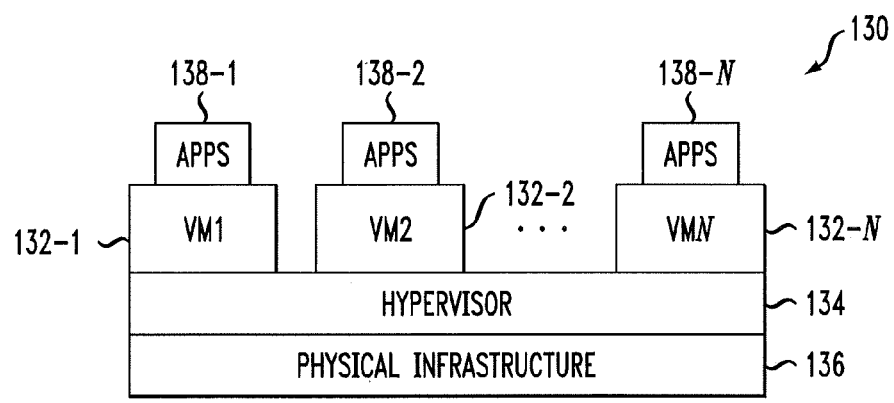
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
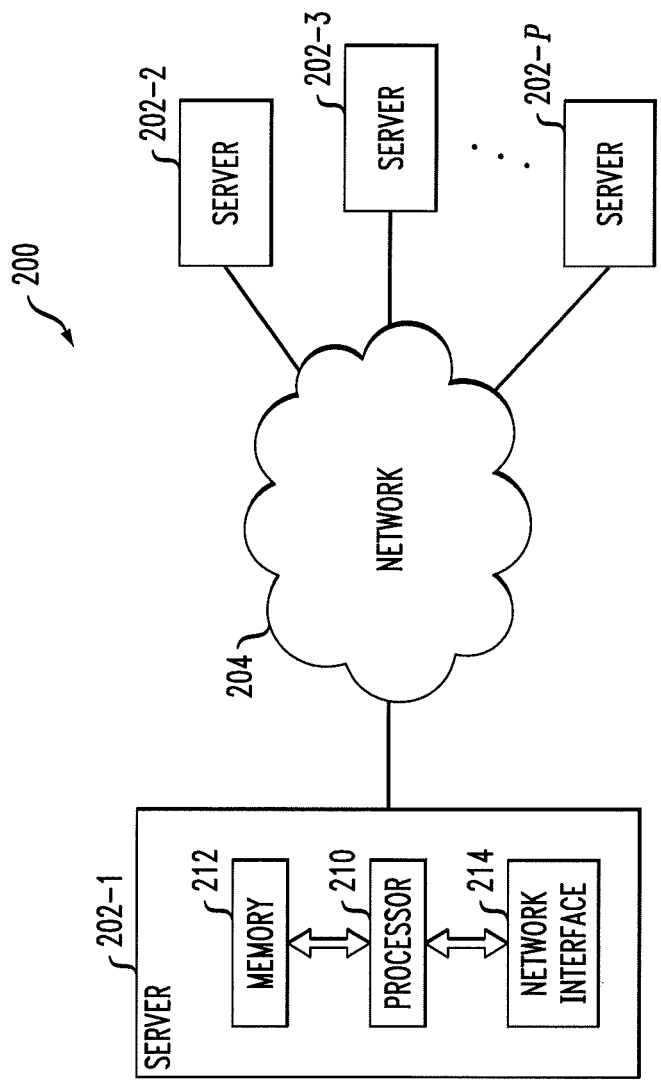
FIG. 2 illustrates a processing platform on which the cloud infrastructure and the data analytics lifecycle automation and provisioning system of FIG. 1A are implemented, in accordance with one or more embodiments of the invention.

An example of a processing platform on which the cloud infrastructure 110 and/or the data analytics lifecycle automation and provisioning 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the data analytics lifecycle automation and provisioning system 120 will now be described with reference to FIGS. 3 and 4.

It is to be understood that the spectrum of complex data problem types that the data analytics lifecycle automation and provisioning system can be used to address is far reaching. By way of example only, the data scientist is typically faced with the task of designing a data processing system that handles data associated with tasks such as, for example, a complex research project, a data mining project involving a very large amount of data (so-called "big data"), one or more applications that a customer entity wishes to be hosted by a service provider entity (e.g., in a data center environment), a business problem, etc. The common problem that the data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data.

Figure 3:
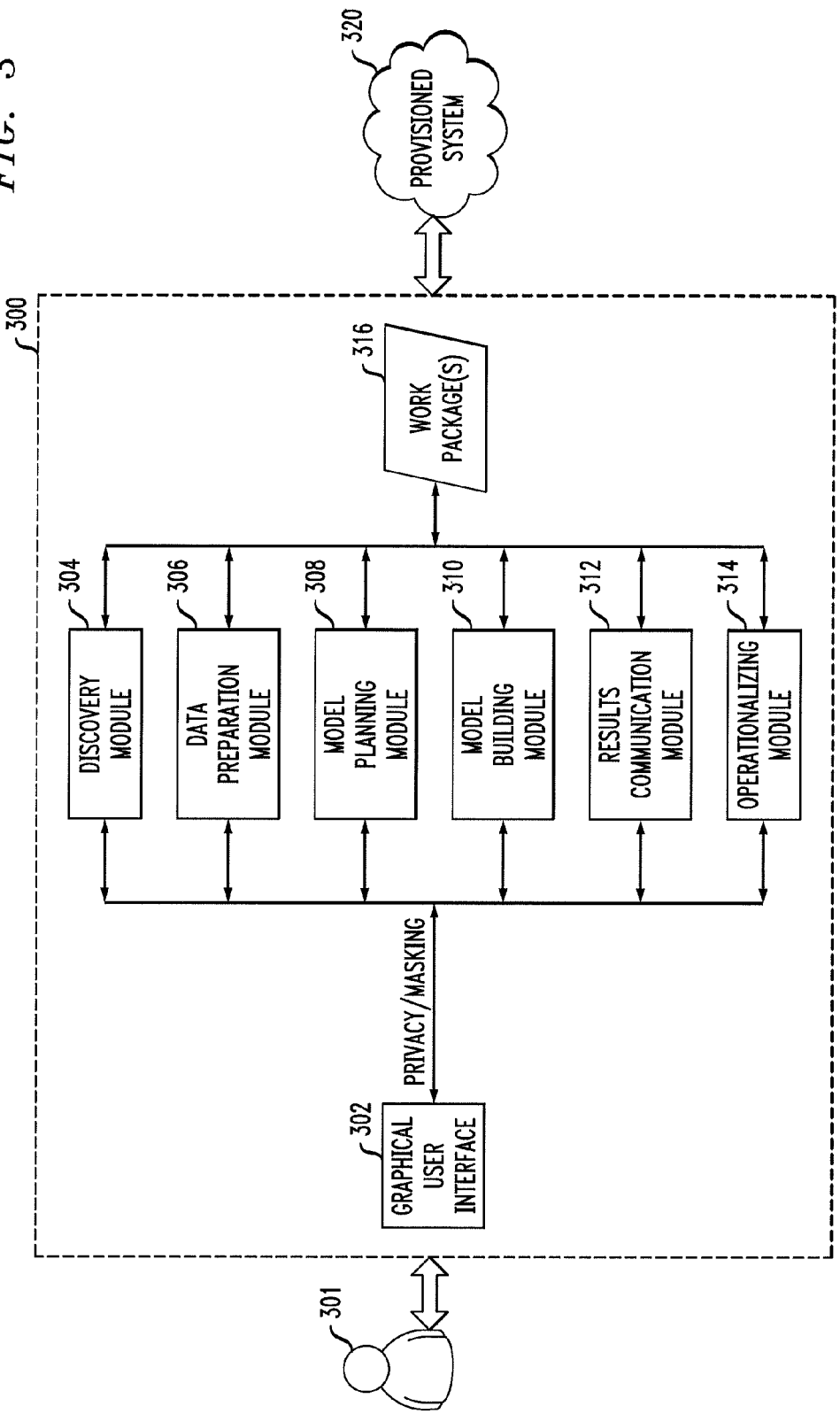
FIG. 3 illustrates a data analytics lifecycle automation and provisioning system, in accordance with one embodiment of the invention.
Figure 4:
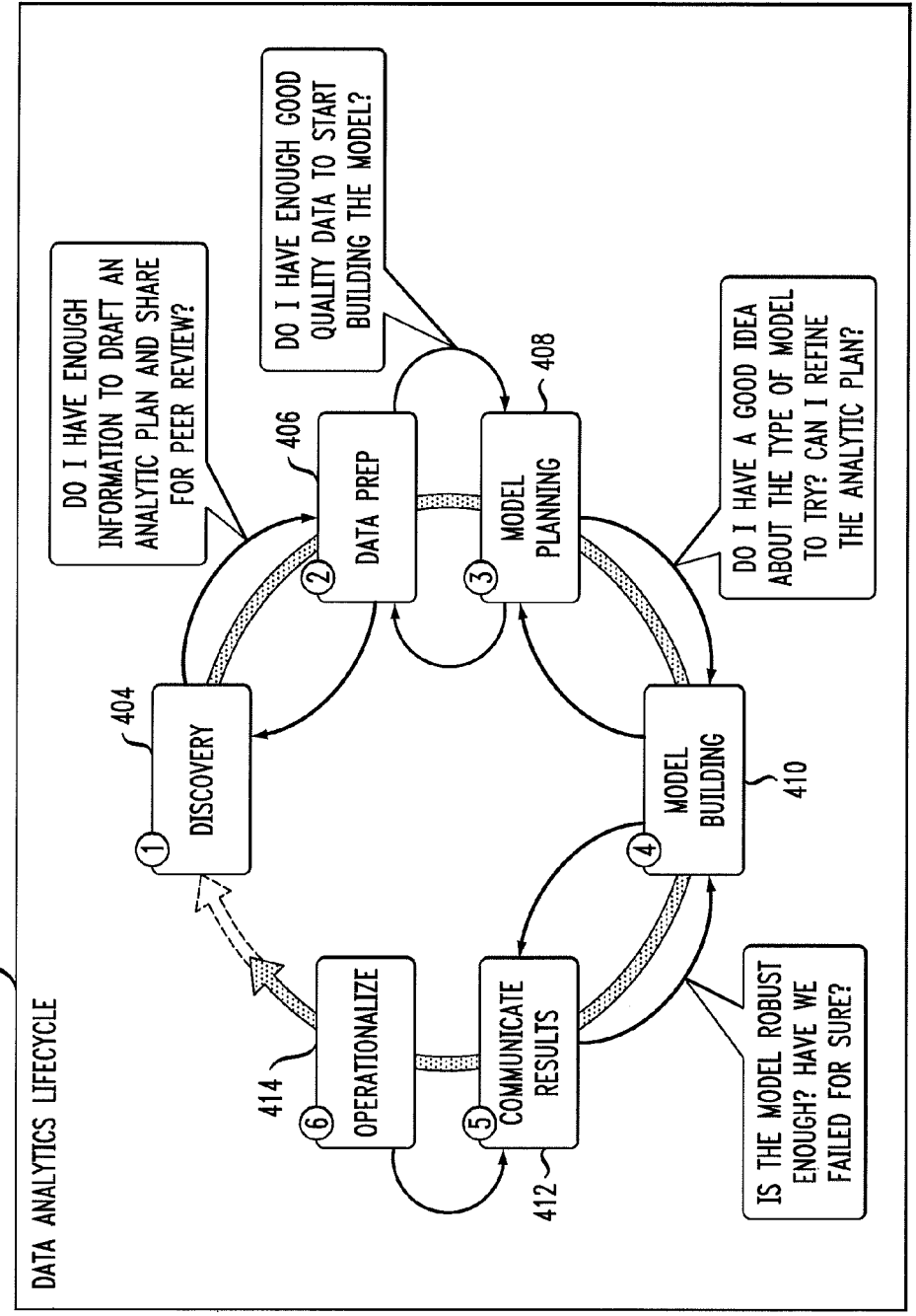
FIG. 4 illustrates a data analytics lifecycle automation and provisioning methodology, in accordance with one embodiment of the invention.

FIG. 3 illustrates a system for assisting the data scientist, inter alfa, to overcome the problems mentioned above. More particularly, FIG. 3 depicts a data analytics lifecycle automation and provisioning system 300 (e.g., corresponding to system 120 of FIG. 1) that allows a data scientist 301 (or some other user or users, e.g., business user) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of a myriad of examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

As will be described in detail below in Section II, discovery module 304 may employ hypotheses aggregation techniques in developing an analytic plan, although it is to be appreciated that such hypotheses aggregation techniques can be implemented independent of and separate from system 300. The techniques specify how, when, why, and where to aggregate hypotheses and what hypotheses to aggregate. By providing a data scientist or business user with hypotheses aggregation functionality, resource consumption, cost and time associated with a data analytic plan are optimized. In addition, as will be further explained, hypotheses aggregation presents opportunities to discover new insights and overcome privacy concerns.

Data Preparation Phase 406 (Performed by Module 306 in System 300).

As the arrows in DAL 402 indicate, the six phases are iterative and interrelated/interconnected, and as such, one phase can be returned to from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data is likely inconsistent.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, structured/unstructured, raw data feeds, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

It is further realized that once the sandbox is created, there are three key activities that allow a data scientist to conclude whether or not the data set(s) he/she is using is sufficient:

(i) Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Perform data conditioning. Clean and normalize the data. During this process, the data scientist 301 also discerns what to keep versus what to discard.

(iii) Survey and visualize the data. The data scientist 301 can create overviews, zoom and filter, get details, and begin to create descriptive statistics and evaluate data quality.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models are applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:

(a) Clustering (e.g., k-means clustering) can find clusters within the data (e.g., create 'k' types of themes from a set of documents).
   (b) Classification can be used to place documents into different categories (e.g., university visits, idea submission, internal design meeting).
   (c) Regression analysis can focus on the relationship between an outcome and its input variables, and answers the question of what happens when an independent variable changes. Regression analysis can help in predicting outcomes. This could suggest where to apply resources for a given set of ideas.
   (d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

Operationalizing Phase 414 (Performed by Module 414 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . " This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data.

Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized data set will contribute to an increased cost, as provisioning will increase. Besides size, other data set characteristics may impact cost, e.g., perhaps publicly available data is cheaper than sensitive data, which requires an anonymization service. System 300 gives the data scientist insight into which data set characteristics would be most beneficial to the analytic plan.

Further, it is realized that the work of all data scientists is not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic work package that includes the parameters needed to move through the analytics lifecycle and include the automation necessary to allow the data scientist to focus on fine tuning the parameters and not on manually changing the infrastructure or data ingest process.

II. Hypotheses Aggregation

We now turn to a description of hypotheses aggregation according to one or more illustrative embodiments of the invention. As mentioned above, hypotheses aggregation may be implemented in the discovery module 304 or any other module in system 300 (and combinations thereof) described above in Section I. However, hypotheses aggregation techniques as will be described herein can be implemented independent of and separate from system 300, and thus are not intended to be limited to any data analytics lifecycle automation system described herein. That is, the techniques may be implemented in a standalone hypotheses aggregation system or in some other computing system that can benefit from the advantages of hypotheses aggregation.

A hypothesis expresses a relationship between concepts. Embodiments of the invention provide a methodology for aggregating hypotheses. The concept of aggregating hypotheses represents a very different approach to problem solving whereby, if multiple users enter hypotheses, then the hypotheses aggregation system is sufficiently intelligent to determine if there is overlap in what they are trying to accomplish, and thus could identify savings and efficiencies for costs, privacy concerns, bandwidth constraints, tools, etc.

Typically, referring back to Section I, a user could submit a hypothesis in the first phase of the data analytics lifecycle. Hypotheses aggregation solves new data science optimization problems: how, when, why, and where to aggregate hypotheses and what hypotheses to aggregate.

How: In an environment where there are multiple users with one or multiple hypotheses, the hypotheses aggregation system is configured to determine how the hypotheses can be aggregated to optimize one or a set of resources.

When: The system is configured to determine when it is recommended or advantageous to aggregate hypotheses taking into account trade-offs and negative implications.

Why: The system determines why users would choose to aggregate hypotheses, e.g., determining whether there are benefits beyond optimizing resource consumption, cost and time, and whether hypotheses aggregation presents opportunities to discover new insights or overcome privacy concerns.

Where: The system determines where hypotheses aggregation occurs, i.e., the system determines whether hypotheses aggregation algorithms are only useful in the first phase of the data analytics lifecycle, or whether they should be run several times throughout the lifecycle.

What: The system determines what makes a hypothesis a good candidate for aggregation, what makes a set of hypotheses a good candidate for aggregation, taking into account whether there are constraints, service level agreements (SLAs), hypothesis types, etc., that would disqualify a hypothesis from aggregation.

Figure 5:
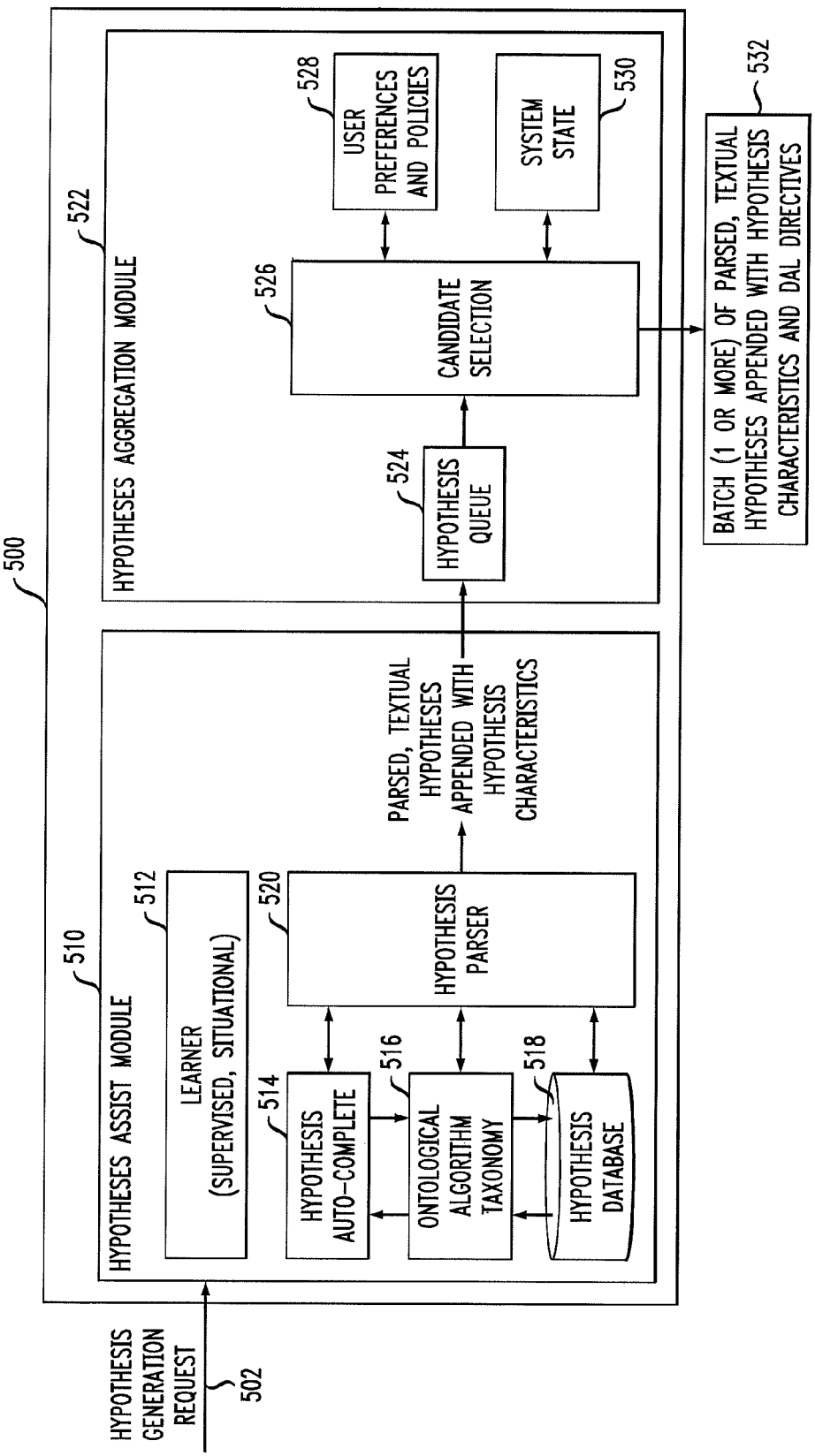
FIG. 5 illustrates a hypotheses aggregation system and methodology, in accordance with one embodiment of the invention.

FIG. 5 illustrates a hypotheses aggregation system and methodology, in accordance with one embodiment of the invention. As shown, a hypotheses aggregation system 500 is responsive to a hypothesis generation request 502 and generates a batch (one or more) of parsed, textual hypotheses appended with hypothesis characteristics and data analytics lifecycle directives 532. The hypotheses aggregation system 500 comprises a hypotheses assist module 510 and a hypotheses aggregation module 522. Hypotheses assist module 510 employs a supervised and situational learning paradigm (learner) 512 that is realized via a hypothesis auto-complete module 514, an ontological algorithm taxonomy module 516, a hypotheses database module 518 and a hypothesis parser module 520. The hypotheses aggregation module 522 comprises a hypothesis queue module 524, a candidate selection module 526, a user preferences and policies module 528 and a system state module 530.

First we describe the components of the hypotheses assist module 510 followed by the components of the hypotheses aggregation module 522.

The ontological algorithm taxonomy module 516 provides a taxonomy of algorithms for use in data analytics projects, including a catalog and ontological mapping of analytical methods with their associated policies, rules, entities and relationships. Developing a taxonomy in an ontological fashion enables the resulting algorithm to make inferences to narrow the set of candidate hypotheses, based on the words and terms in the original hypotheses and identify related and suitable types of analytical methods.

The hypothesis database module 518 is a backend data store of hypotheses that end users type in to the system. The hypothesis database can be used for auto-complete (in conjunction with hypothesis auto-complete module 514) for new hypotheses being written, by executing PageRank functions to identify the most likely sentence completions, similar to (but not limited to) how a search engine uses Search Assist to suggest similar words to help users complete searchable phrases. In addition, the hypothesis database module 518 can be used to store associations of which tuples of [hypotheses and algorithms] were effective and selected by the user, so it can learn over time and refine its suggestions in the future.

The hypothesis auto-complete module 514 employs one or more of the ontological algorithm taxonomy module 516, the hypothesis database module 518, and a user database (not specifically shown) containing metadata such as user job title and pointers to the hypothesis database (used for personalization), and historical data (e.g., assume there is a customer data set, so when a user starts typing "company's most valuable . . . " suggest "customers"), to provide auto-completion functionality to end users, who are trying to write hypotheses.

The hypothesis parser module 520, in one embodiment, employs Natural Language Processing (NLP) on the hypotheses to parse the text of the hypotheses and then find suitable analytical methods that are associated with particular phrases or text strings, given the context and objectives of the hypotheses.

The four modules in hypothesis assist module 510 form the core of a set of learning algorithms (learner paradigm 512) that identifies suitable analytical methods, recommend hypotheses, and teach people to write better hypotheses over time to use and test within data science projects. In addition, the hypothesis assist module 510 represents a new approach to describing and subsequently acting on what otherwise would remain as vaguely articulated problems to enable more accurate, less costly, and faster analytical projects. The result of this set of features is a textual hypothesis that has been parsed and analyzed, which is then passed to the hypotheses aggregation module 522.

The hypothesis queue module 524 holds (stores) individual hypotheses until they are ready for further processing. The user preferences and policies module 528 comprises a collection of user constraints, e.g., maximum cost, maximum time, privacy restrictions. The system state module 530 describes system availability and other system/sub-system metrics such as, e.g., throughput, response time, capacity, reliability, and cost. The system strives to avoid a state where there is risk of idling, unbalanced resource utilization, starvation, etc.

The candidate selection module 526 takes one or more hypotheses from the queue and determines whether a hypothesis is a good candidate for aggregation or not. In one embodiment, the selection process depends on the following factors:

(1) user preferences and polices as specified by module 528; (2) hypothesis characteristics, such as appropriate analytical methods or selection of data, which are appended to each hypothesis; and (3) system state as specified by module 530. If candidates are selected for aggregation, the original hypotheses, appended with hypothesis characteristics and data analytics lifecycle directives, are removed from the hypothesis queue module 524 and sent for processing in a batch 532. The data analytics lifecycle directives instruct which resources should be shared, what is the common data that should only be pulled once instead of n times, what hypotheses should be ignored due to duplication, etc.

Given the illustrative system and methodology described above in the context of FIG. 5, we now describe illustrative features and examples that flow from such hypotheses aggregation system and methodology.

Hypotheses aggregation, as mentioned above, can be implemented in the data analytics lifecycle automation and provisioning system 300 described above in FIG. 3. For example, hypotheses aggregation can occur in phase 1 (discovery) by batching, as described above. In subsequent phases of the data analytics lifecycle, changes in user preferences or characteristics, hypothesis characteristics, or system state, as described above, may trigger de-aggregation, or increased aggregation. This feature is advantageous because as the user or data scientist gets additional information during subsequent phases of the cycle, they typically refine the hypotheses and then hypotheses aggregation can be invoked at that point as well.

Example 1

Consider the following running example. The following is a set of hypotheses from two users, Alice and Bob:

A1: (9:15 am) years of school increases hourly rate pay
B1: (9:20 am) highest degree completed increases hourly rate pay
A2: (11:15 am) years of school increases yearly salary
A3: (1:30 pm) years of school decreases number of dependents Suppose Alice and Bob specify that they are willing to wait until the end of the day and noon, respectively, for a less costly response. In that case, A1, B1, and A2 may be aggregated and flow together through the data analytics lifecycle of system 300 (which is assumed to have hypotheses aggregation functionality as described herein). Bob's time constraint dismisses A3 as a candidate for aggregation with A1, B1, and A2.

Example 2

From example 1 above, we see that, collectively, Alice and Bob built a conceptual framework (education increases income), to test a higher-level hypothesis that may eventually lead to new insights. As A1, B1 and A2 travel together through the lifecycle, further savings are realized as both pertain to education. For example, in phase 2 (data preparation), the education data would only have to be accessed once.

Example 3

Assume in example 1 above that Bob changes his mind at 10:00 am and sets his time constraint to 11:00 am. At that point, the hypotheses aggregation system determines that hypothesis A2 is no longer a good candidate to aggregate with A1 and B1. Factoring in the state of the system (e.g., resource utilization), the system may even determine that the optimal aggregation scheme would be as follows:

{B1}
{A1, A2, A3}

The above de-aggregation (i.e., {A1, B1, A3}) and new aggregation {A1, A2, A3} could have occurred anywhere in the data analytics lifecycle.

Example 4

In example 1 above, we had the following factors:
1) User preferences and characteristics:
End of day and noon time constraints
Minimum cost
2) Hypothesis characteristics:
Concepts/data: education {years of school, highest degree}, income {hourly rate pay, yearly salary}, dependents Given Alice and Bob's common desire to trade-off execution time to drive down cost, as well as the common concept and data characteristics of the hypotheses, these hypotheses are good candidates for aggregation.

Example 5

Suppose in example 1 above, A3 was replaced by Carl's hypothesis:
C1: (1:30 pm) years of school decreases number of dependents Notice that except for Carl's hypothesis, the data sets that would have to be accessed in phase 2 of the data analytics lifecycle contain sensitive information: an employee's salary. Assuming Alice and Bob have access privileges to the sensitive information, there are no privacy breaches after aggregating A1, B1, and A2. Although Carl may be willing to aggregate his hypothesis with those of Alice and Bob for cost savings (due to overlap in education dataset), the system recognizes Carl does not have access privileges for the salary data and does not aggregate his hypothesis with the others, thereby preventing a privacy breach.

Furthermore, it is to be appreciated that hypotheses aggregation as described herein can be offered as a service, i.e., Hypotheses Aggregation as a Service (HAaaS). For example, a client can access the service via a cloud infrastructure similar to cloud infrastructure 110 of system 100 in FIG. 1.

In one embodiment, the hypotheses aggregation service is offered to users of the data analytics lifecycle automation and provisioning system 300 described above in FIG. 3. For example, in the first phase of the data analytics lifecycle, one key task is to translate a problem into a hypothesis; essentially an idea expressed as a relationship between concepts, which can be tested with data, analytical methods and tools. This task can be very challenging on its own and users may not be equipped with the skill set to optimize resource consumption, cost, time, etc. Thus, the service assists the user with this task or otherwise performs the task. Also, the service presents opportunities to discover new insights and overcome privacy concerns. The service can also offer additional optimizations, e.g., if multiple users sign up to aggregate their hypotheses, then the group is collectively rewarded.

The service performs the operations described above in the context of FIG. 5. The service may assign users reputation ratings, e.g., how environmentally friendly or green, how cooperative, how active, etc.

Given one or more hypotheses in a queue, the service will use a candidate selection algorithm, as described above, to determine whether a hypothesis is a good candidate for aggregation or not. While, in an embodiment described above, the selection process depends on three factors: (1) user preferences and characteristics; (2) hypothesis characteristics; and (3) system state, a user may override, for example, to specify no aggregation, aggregation only with a specified group of "friends," etc. A user may also specify constraints, e.g., maximum cost, time, or have a profile that imposes restrictions on resources.

In the context of the data analytics lifecycle described above, users can sign up for the hypotheses aggregation service in phase 1 (discovery) and in subsequent phases of the lifecycle, changes in user preferences or characteristics, hypothesis characteristics, or system state, can trigger the service to de-aggregate, increase aggregation, prompt active users to change preferences or refine hypotheses, broadcast to registered users to come join an aggregation, etc.

Further, some data sets may have privacy policies and constraints attached, especially those containing sensitive information, such as a patient's disease, or an employee's salary. The service prevents privacy breaches by de-aggregating, where necessary.

Still further, some users of the service may require notification and explicit approval for hypotheses aggregation, while others would be satisfied to pay up front and receive funds back should hypotheses aggregation and savings occur (i.e., chargeback) with or without the need for explicit approval.

Example 6

Consider the following running example. The following is a set of hypotheses from three users, Alice, Bob, and Carl:

A1: (9:15 am) years of school increases hourly rate pay

B1: (9:20 am) highest degree completed increases hourly rate pay

A1 (11:15 am) years of school increases yearly salary

A3: (1:30 pm) years of school decreases number of dependents

C1: (2:30 pm) highest degree completed increases hourly rate pay

Assume that Alice, Bob, and Carl are all registered users for the hypothesis aggregation service, but for different reasons. Alice is an advocate of Green initiatives and is so concerned about saving the environment, she would rather wait until the end of a day to get results than have results earlier at the cost of poor resource utilization. Bob subscribes to the service for the chance of cost savings; however, he never wants to wait for more than an hour. Carl enjoys being part of a community and discovering new insights.

The service recognizes there is a hard constraint set by Bob to provide results by 9:20 am. The service runs candidate selection, as described above, to determine that hypotheses A1 and B1 can be aggregated, since they will both require information from the same data sets. The service lets Alice and Bob know there is potential for aggregation. Since Alice knows she will have more hypotheses later, she does not like Bob's Green reputation, and there is a fast approaching time constraint, she declines the offer and opts to stay in the queue.

At 2:00 pm, the service hits a threshold (e.g., time of day, number of hypotheses in the queue, level of activity, etc.) and broadcasts an invite to registered users to join an aggregation. Carl gets the message and is generally interested, so submits a hypothesis with no time constraints. At the end of the day, the service runs candidate selection, and notifies Alice and Carl that their hypotheses are candidates for aggregation. Both agree to aggregate; Alice agrees explicitly and pays afterwards, while Carl implicitly agrees upfront and receives his savings from aggregation back into his account through a chargeback mechanism.

Example 7

Except for hypothesis A3 in example 6, the data sets that would have to be accessed in phase 2 (data preparation) of the data analytics lifecycle contain sensitive information: an employee's salary. Assuming Alice, Bob, and Carl have access privileges to the sensitive information, there are no privacy breaches after aggregating hypotheses. Suppose, however, that Dania comes along with the following hypothesis:

D1: (2:35 pm) years of school lowers risk of disease

Although all parties may be willing to aggregate their hypotheses, and there is overlap in data sets (namely, education), the service prevents privacy breaches by de-aggregating at phase 2 of the data analytics lifecycle. Dania should not have access to privacy salary information, while Alice and Carl should not have access to private patient information.

Example 8

From example 6, we see that instead of Alice and Carl's hypotheses being tested separately, the service can save compute resources and save Alice and Carl money. Collectively, Alice and Carl built a conceptual framework (education increases income) to test a higher-level hypothesis that may eventually lead to new insights. As their hypotheses travel together through the lifecycle, further savings are realized as both pertain to education. For example, in phase 2 of the lifecycle, the education data would only have to be accessed once. Another benefit of the service is that it encourages participation for the sake of knowledge discovery and community, driving more business for the service provider.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

storing a plurality of hypotheses associated with one or more data analytics tasks in a storage queue;

selecting two or more hypotheses of the plurality of hypotheses for aggregation;

aggregating the selected two or more hypotheses into a hypotheses group such that the selected two or more hypotheses of the hypothesis group are processed together using one or more common resources to perform at least one of the one or more data analytics tasks; and de-aggregating at least one of the selected two or more hypotheses aggregated into the hypotheses group from the hypotheses group in response to one or more user-based criteria.

2. The method of claim 1, further comprising removing the selected two or more hypotheses aggregated into the hypotheses group from the storage queue.

3. The method of claim 1, wherein the one or more common resources comprise one or more computing resources.

4. The method of claim 1, wherein the one or more common resources comprise one or more data storage resources.

5. The method of claim 1, wherein the selection of the two or more hypotheses of the plurality of hypotheses to aggregate is based on one or more user-based criteria.

6. The method of claim 5, wherein the one or more user-based criteria comprise at least one of a time constraint, a cost constraint and a privacy constraint.

7. The method of claim 1, wherein the selection of the two or more hypotheses of the plurality of hypotheses to aggregate is based on one or more resource-based criteria.

8. The method of claim 7, wherein the one or more resource-based criteria comprise at least one of a throughput constraint, a response time constraint, a capacity constraint, a reliability constraint and a cost constraint.

9. The method of claim 1, wherein the selection of the two or more hypotheses of the plurality of hypotheses to aggregate is based on one or more hypothesis-based criteria.

10. The method of claim 9, wherein the one or more hypothesis-based criteria comprise at least one of an analytic method constraint and a data selection constraint.

11. The method of claim 1, further comprising, prior to storing each of the plurality of hypotheses in the storage queue, pre-processing each of the plurality of hypotheses.

12. The method of claim 11, wherein the pre-processing of a given hypothesis comprises parsing the hypothesis based on a natural language processing technique.

13. The method of claim 11, wherein the pre-processing of a given hypothesis comprises auto-completing the hypothesis based on at least one of an ontological algorithm taxonomy, a hypothesis database and a user database.

14. The method of claim 11, wherein the pre-processing of a given hypothesis comprises identifying one or more analytic methods suitable for use with the hypothesis.

15. The method of claim 1, wherein the storing, selecting and aggregating steps are performed in at least one phase of a data analytics lifecycle.

16. A computer program product comprising a non-transitory processor-readable storage medium having encoded therein executable code of one or more software programs, wherein the one or more software programs when executed by one or more processing elements of a computing system implement the steps of:
    storing a plurality of hypotheses associated with one or more data analytics tasks in a storage queue;
    selecting two or more hypotheses of the plurality of hypotheses for aggregation;
    aggregating the selected two or more hypotheses into a hypotheses group such that the selected two or more hypotheses of the hypothesis group are processed together using one or more common resources to perform at least one of the one or more data analytics tasks; and
    de-aggregating at least one of the selected two or more hypotheses aggregated into the hypotheses group from the hypotheses group in response to one or more user-based criteria.

17. An apparatus comprising:
a memory; and
at least one processor operatively coupled to the memory and configured to:
store a plurality of hypotheses associated with one or more data analytics tasks in a storage queue maintained in the memory;
select two or more hypotheses of the plurality of hypotheses for aggregation;
aggregate the selected two or more hypotheses into a hypotheses group such that the selected two or more hypotheses of the hypothesis group are processed together using one or more common resources to perform at least one of the one or more data analytics tasks; and
de-aggregate at least one of the selected two or more hypotheses aggregated into the hypotheses group from the hypotheses group in response to one or more user-based criteria.

18. The apparatus of claim 17, wherein the selection of the two or more hypotheses of the plurality of hypotheses to aggregate is based on at least one of: one or more user-based criteria; one or more resource-based criteria; and one or more hypotheses-based criteria.

19. The apparatus of claim 17, wherein the storage, selection and aggregation are performed in at least one phase of a data analytics lifecycle.

* * * * *